No. 872,499. PATENTED DEC. 3, 1907.
J. M. COOPER.
HAME AND TRACE CONNECTOR.
APPLICATION FILED AUG. 17, 1906.
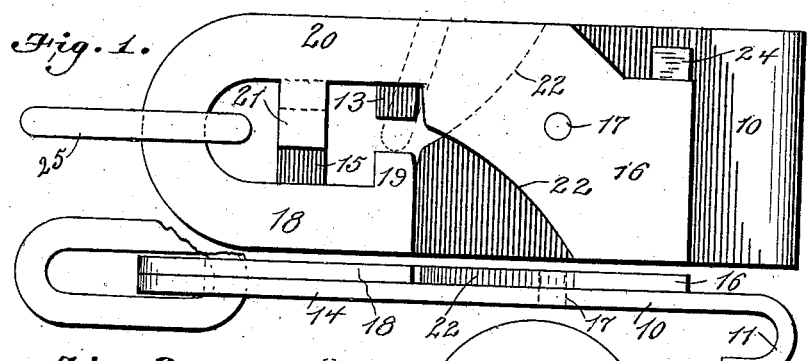
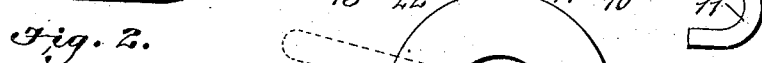
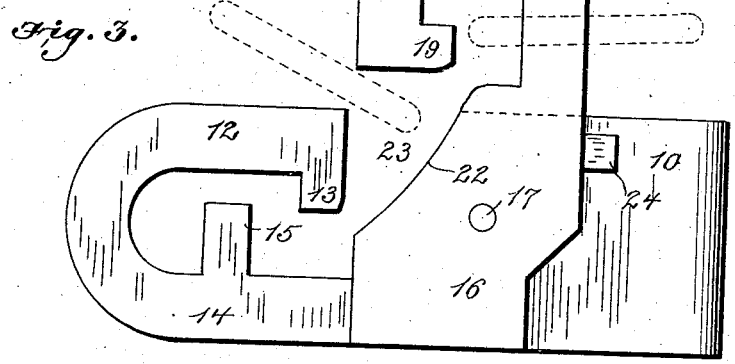
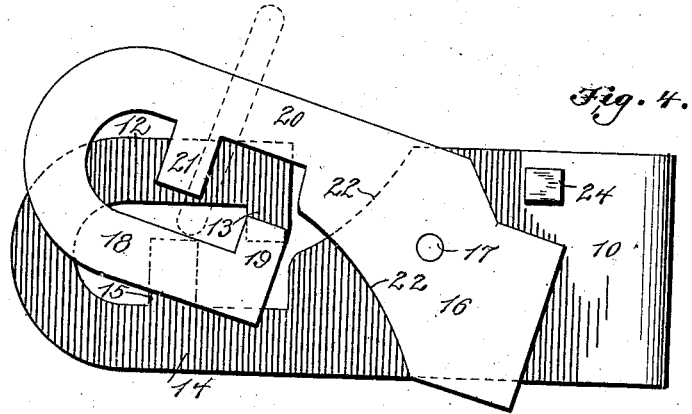
Witnesses
O. E. Murray.
M. A. Schmidt
Inventor
John M. Cooper
By
Attorneys.

UNITED STATES PATENT OFFICE.

JOHN M. COOPER, OF PASKENTA, CALIFORNIA.

HAME AND TRACE CONNECTOR.

No. 872,499.
Specification of Letters Patent.
Patented Dec. 3, 1907.

Application filed August 17, 1906. Serial No. 331,012.

*To all whom it may concern:*

Be it known that I, JOHN M. COOPER, a citizen of the United States, residing at Paskenta, in the county of Tehama and State of California, have invented new and useful Improvements in Hame and Trace Connectors, of which the following is a specification.

This invention is a hame and trace-connector, and has for its object to provide a device of this kind which will securely hold the trace-ring or link, and also permit said ring or link to be readily removed.

The invention comprises two hooks, one of which is fastened to the hame. The other hook is pivoted to the first mentioned one, and coöperates therewith in a manner herein described, to prevent accidental disengagement of the trace-ring or link.

In the accompanying drawing, Figure 1 is a plan view of the invention. Fig. 2 is an end view. Figs. 3 and 4 are plan views illustrating the manner in which the trace-ring or link is placed inside the hook.

Referring specifically to the drawing, the stationary hook-member comprises a flat plate 10 having at one end a hook 11 whereby it is fastened to the hame in a suitable manner. At the opposite end of the plate is a hook 12 having at its end a lug 13 extending inwardly toward the shank 14 of the hook. From the inner edge of the shank, a finger 15 extends toward the hook, the outer end of the finger being spaced from the hook sufficiently to permit the passage of the trace-ring or link.

The movable hook-member 16 is pivoted at 17 to the plate 10, and its hook 18 is a duplicate of the hook 12, and is oppositely presented thereto. The hook 18 also has a lug 19 at its extremity, and the shank 20 of said hook also has a finger 21 extending from its inner edge. When the hooks are closed the hook 12 and shank 14, and the shank 21 and hook 12 coincide. In this position the fingers 15 and 21 overlap and form a crossbar for retaining the trace-ring or link within the hooks. Both members are cut away as at 22 to form a large passage 23 for the entrance of the trace-ring or link into the hooks, and these passages coincide when the hooks are open. The plate 10 has a stop-lug 24 to limit the outward swing of the member 16.

The trace-ring or link is indicated at 25, and it is placed within the device in the following manner: The member 16 is swung outwardly from the fixed member until there is sufficient space between the edges of the hooks 12 and 18 to permit the ring to be placed over the shank 20 as shown in Fig. 3. The member 16 is then swung over the fixed member as shown in Fig. 1. During this movement, the ring will be carried downwardly through the passage 23, and when the parts are in the position shown in Fig. 1 the ring will be extended into the space behind the cross-bar formed by the fingers 15 and 21. The ends of the lugs 13 and 19 are spaced apart sufficiently to afford a passage for the ring. The next step is to bring the ring into its final position in front of the cross-bar. This is done by swinging the hook 18 away from the hook 12 to separate the fingers 15 and 21 sufficiently for the ring to pass between the finger 15 and the hook 12 as shown in Fig. 4. Upon swinging the hooks together again and pushing the ring fowardly it will come into position in front of the cross-bar, which completes the operation. In this position the ring will be securely held within the hooks without danger of accidental displacement. The removal of the ring from the hooks is effected by a reversal of the operation herein described.

I claim:—

In a hame and trace connector, a stationary member comprising a plate having at one end means for fastening the same to a hame, and at the opposite end a hook having its extremity offset toward the shank of the hook, a finger projecting from the shank of the hook within the bill or bend thereof, and with its free end spaced from the hook, and a movable member pivoted to the aforesaid plate, and having a hook oppositely presented to the first mentioned hook, said movable hook having its extremity offset toward its shank, and a finger projecting from said shank within the bill or bend of the hook, and with its outer end spaced from the hook, the shank of one of the hooks coinciding with the other hook when the hooks are closed, and the fingers overlapping to form a cross bar extending across the body of the hooks within the ends or extremities thereof.

In testimony whereof I have signed my name to this specification in the presence of two subscribing witnesses.

JOHN M. COOPER.

Witnesses:
 WILLIAM LEE,
 C. P. NEWCOMER.